United States Patent
Denkin et al.

(10) Patent No.: US 6,266,168 B1
(45) Date of Patent: Jul. 24, 2001

(54) OPTICAL PROTECTION SWITCH EMPLOYING AN INTERFERENCE FILTER

(75) Inventors: Nathan Myron Denkin, Aberdeen; Wei-Chiao William Fang, Middletown; Daniel A. Fishman, Lakewood, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/994,213

(22) Filed: Dec. 19, 1997

(51) Int. Cl.[7] .................... H04B 10/20; H04B 10/08
(52) U.S. Cl. .......................... 359/110; 359/119
(58) Field of Search .................... 359/110, 161, 359/173

(56) References Cited

U.S. PATENT DOCUMENTS 5,680,235   10/1997   Johansson .................... 359/110

FOREIGN PATENT DOCUMENTS

WO 97/01907   1/1997   (WO) .................... H04L/12/437

*Primary Examiner*—Leslie Pascal
*Assistant Examiner*—Dalzid Singh

(57) ABSTRACT

A protection facility is provided for use in an optical communications node that communicates with another optical communications node via first and second bidirectional communications paths respectively serving as a service path and protection path, in which a filter filters signals respectively received over the service and protection paths and generates a main signal and a complementary signal for each of the paths. A control unit then generates a Loss of Signal (LOS_A) indication for the service path if a SUM signal or DIFF signal respectively derived as a function of a sum of the main and complementary signals generated for the service path and difference between the main and complementary signals generated for the service path is less than a respective threshold value. A switch then invokes protection switching responsive to the presence of the LOS_A indication.

23 Claims, 5 Drawing Sheets

OPTICAL PROTECTION SWITCH EMPLOYING AN INTERFERENCE FILTER

FIELD OF THE INVENTION

The invention relates to optical switching and more particularly relates to a path protection feature for an optical switch.

BACKGROUND OF THE INVENTION

It is well-known that a provider/operator of a communications network strives to increase the level of "survivability" of the network whenever a fault occurs, e.g., a loss of signal is detected over a communications path. The operator typically increases the level of survivability by employing a protection-switching architecture to recover from a loss of signal condition. Protection switching, as it is commonly referred to, involves establishing preassigned backup resources, e.g., a duplicated/standby communications path, which may be switched into service when a loss of signal occurs.

The detection of a loss of a signal is usually done simply by comparing the level of an optical signal received via a communications path with a predetermined threshold. If the level of the received optical signal is continuously below the threshold for a predetermined period of time, then protection switching may be requested for that communications path.

It appears, however, that the presence of one or more optical amplifiers in a communication path complicates the detection of a Loss Of Signal (LOS), since the amplifiers may not immediately reduce their output power when an LOS occurs. As a result, the level of the received signal may not change until each optical amplifier in the path has been instructed by a local controller to reduce its laser pump power and thus its output power. Disadvantageously, user data may be lost, since a substantial amount of time, e.g., 700 milliseconds, may be exhausted before the LOS is detected.

Moreover, the detection of a LOS is further complicated if the optical signal is composed of a plurality of optical signals of different wavelengths $\lambda I$.

SUMMARY OF THE INVENTION

We deal with the foregoing amplifier problem, in accordance with an aspect of the invention, by employing an interference filter to generate a number of different signals, e.g., main and complementary signals. These signals are then processed such that if either their sum or difference is below a respective threshold, indicating that only a noise signal is present, then a Loss Of Signal (LOS) is declared, and the system is switched to the protection line if that line is found to be available for service.

Advantageously, in this way protection switching may be invoked rapidly, typically within, for example, 3 milliseconds from the detection of a LOS, all in accordance with the principles of the invention.

These and other aspects of the invention, will become apparent from the following detailed description and accompanying drawing.

GENERAL DESCRIPTION

The following is a brief general description of the principles of the invention. It will be followed by a more detailed description.

The operational procedure that is followed to detect a Loss of Signal on an incoming, active communication path (i.e., either the service line or protection line) includes supplying a signal received from the active communication path to an interference filter, e.g., a Mach-Zehnder interferometer, to generate a main signal and a complementary signal. The sum and difference of the main and complementary signals are then generated and both are supplied to a summing circuit and difference circuit. If either the sum or difference of those signals is below a respective threshold for a predetermined period of time, e.g., fifty milliseconds, then a LOS is declared, thereby invoking the protection switching process.

Specifically, the process includes driving a 2×1 switch into a protection state to activate the incoming protection path and deactivate the incoming active path. For bi-directional switching, the outgoing active path is disrupted for a sufficient period of time, e.g., 4seconds, to cause a LOS at the opposite end of that path, and to cause equipment thereat to declare a LOS and invoke protection switching at that end of the transmission path, thereby completing the bi-directional protection switching process.

Thereafter, if an LOS occurs on the protection path, which is now in service, and the LOS is detected in the foregoing manner, then the system, in accordance with an aspect of the invention, will switch to the non-protection path if it is available for service. In addition, the system disrupts the signals that are being delivered to the opposite/far end via the outgoing protection path to cause the far end to switch back to the non-protection path.

DETAILED DESCRIPTION

Figure 1:
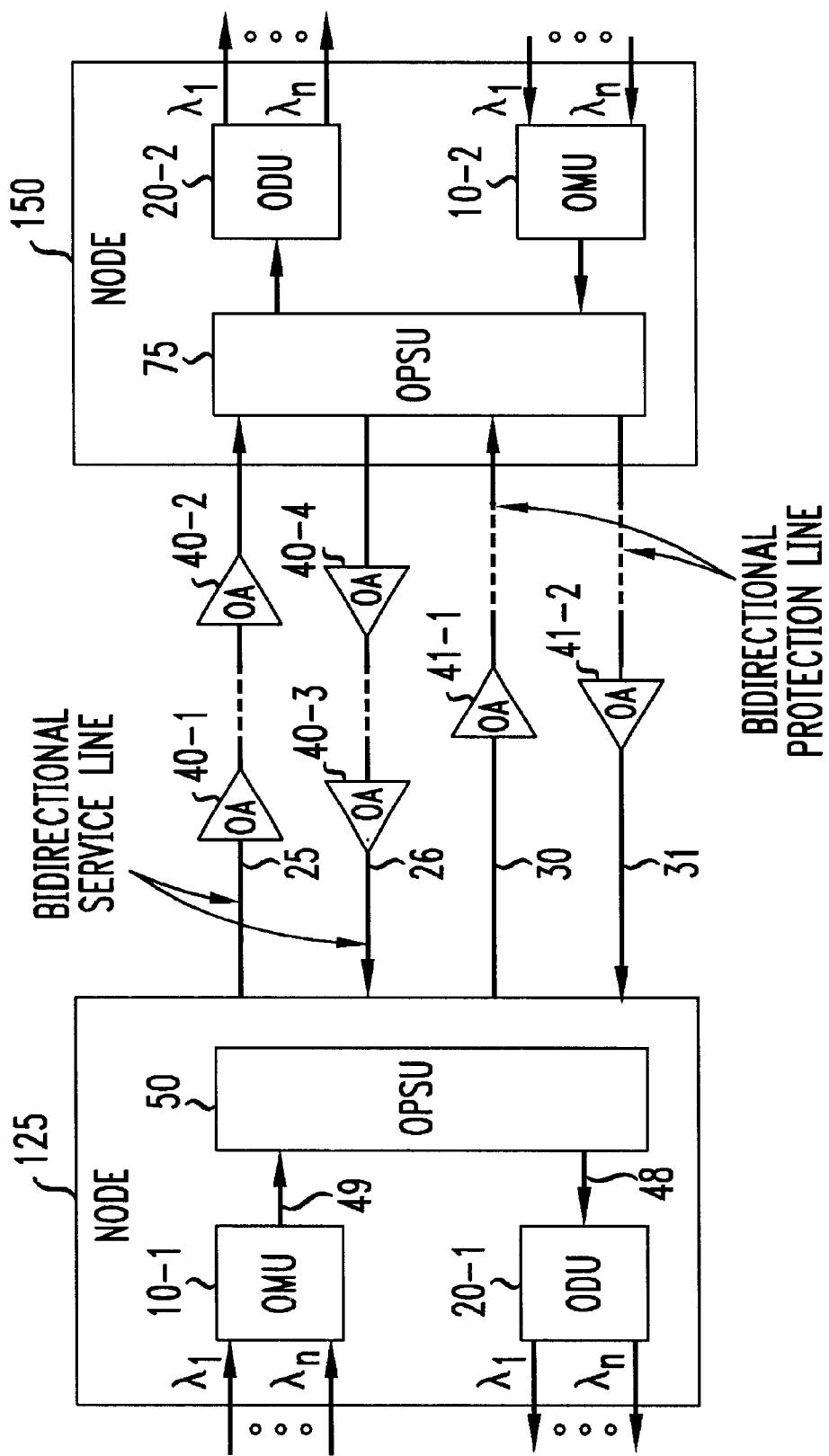
FIG. 1 is a broad block diagram of an optical transmission system employing protection switching arranged in accordance with the principles of the invention.

An optical communications system employing the principles of the invention to discern a LOS is illustrated in FIG. 1, in which optical transmission system 100 includes optical nodes 125 and 150. An optical node, e.g., node 125, includes, among other things, a conventional Optical Multiplexing Unit (OMU) 10-1 which multiplexes a plurality of optical signals of different wavelengths, $\lambda_i$, onto an optical carrier signal and then supplies the multiplexed carrier to Optical Protection Switch Unit (OPSU) 50, which is a characteristic of a so-called Digital Wavelength Multiplex System (DWDM). It is seen from FIG. 1, that OPSU 50 connects to a bi-directional service line formed by bi-directional service paths 25 and 26. It also connects to a bi-directional protection line formed from bi-directional paths 30 and 31. For the time being, assume that traffic is being sent and received via in-service lines 25 and 26. Then, OPSU 50 outputs the carrier signal that it receives from OMU 10-1 to line 25 for transmission to node 150. Similarly, node 150 outputs an optical carrier signal that it receives from OMU 10-2 to line 26 for transmission to node 125. Optical carrier signals that OPSU 50 receives from line 26 are supplied to conventional Optical Demultiplexing Unit (ODU) 20-1, which, in turn, demultiplexes the received signal into a plurality of signals of different wavelengths which formed the signal that was received at node 150. OPSU 75 and ODU 20-2 operate similarly with respect to signals received via path 25. It seen that the in-service lines 25 and 26 include optical amplifiers 40-i which, as discussed above, makes it difficult to detect a LOS occurring on either line 25 or 26, as mentioned above.

Figure 2:
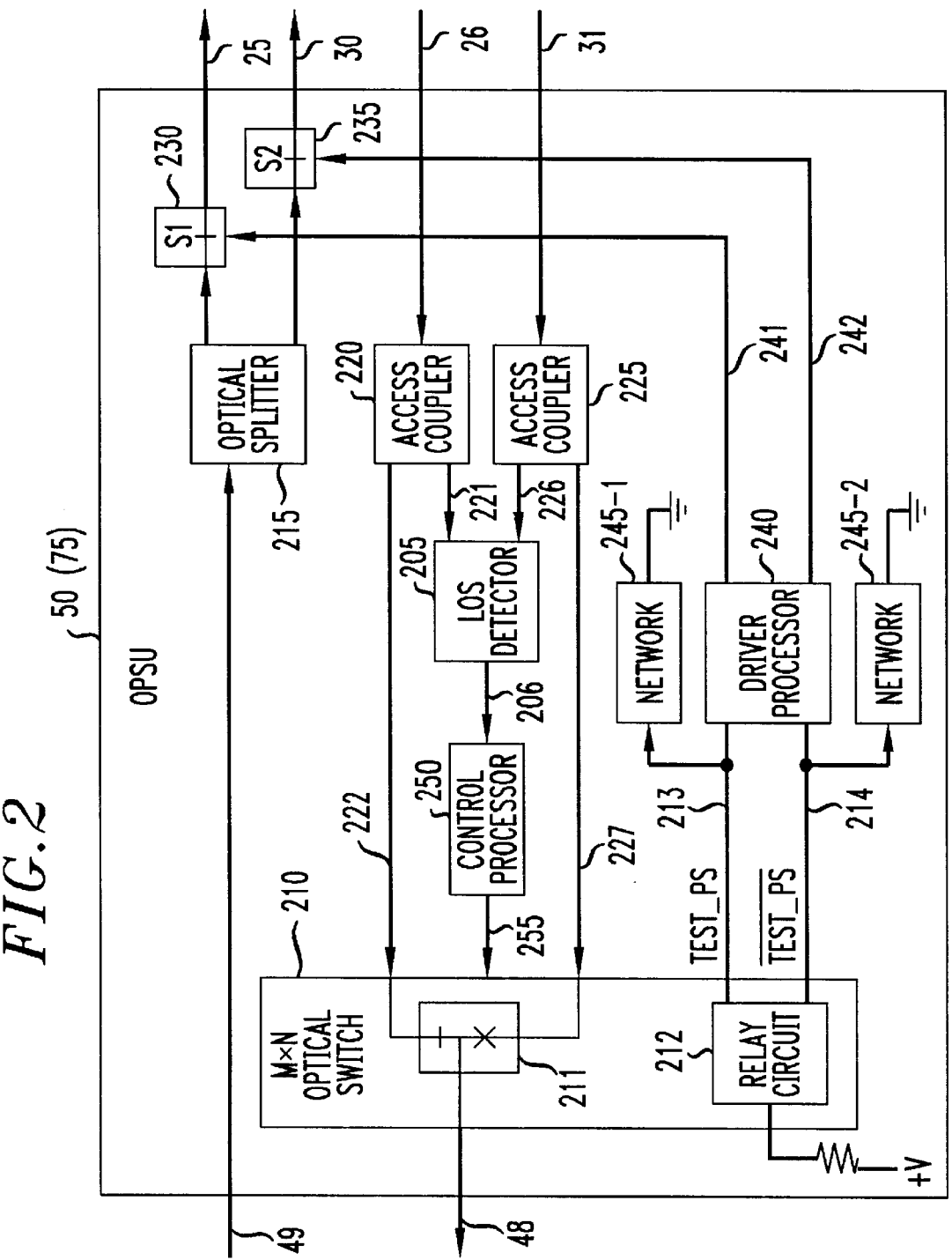
FIG. 2 is a block diagram of the Optical Protection Switch Unit (OPSU) of FIG. 1.

As also mentioned above, we deal with that problem by generating main and complementary signals from the received signal such that the main (complementary) signal is formed from signals that constructively (destructively) interfere with one another and such interference is then used to determine if a LOS has occurred. Such generating and determining, which we refer to as detection, is carried out in an OPSU, a block diagram of which is shown in FIG. 2. It is noted that a discussion of one OPSU, e.g., OPSU 50, equally pertains to the other OPSU, e.g., OSPU 75, and vice-versa.

Turning then to FIG. 2, OPSU 50 includes a conventional optical splitter 215, e.g., a so-called 50—50 splitter, which splits/divides the optical signal received via path 49 between outgoing service path 25 and protection path 30. As mentioned above, the signal supplied to path 25 may be interrupted by opening (operating) conventional optical switch 230 (also designated S1) to cause a LOS at the far end and thus invoke protection switching thereat. Similarly, the system may operate conventional optical switch 235 (also designated S2) to cause the far-end node to switch to the non-protection path (i.e., switch back to paths 25 and 26 if they are available, as will be discussed below in detail).

The signal received from the far end via service path 26, on the other hand, is supplied to access coupler 220, which may be, for example, a conventional optical tap, so that a small portion, e.g., 1.8%, of the received signal may be supplied to LOS detector 205 via optical path 221 for processing. The remainder of the signal received via path 26 is supplied to optical switch 210 via optical path 222. Similarly, the signal received via protection path 31 is supplied to access coupler 225, which is also a conventional optical tap, so that a small portion, e.g., 1.8%, of the protection signal may also be supplied to LOS detector 205 via optical path 226 for processing. The remainder of the protection signal is supplied to optical switch 210. Latchable optical switch 210, whose state is controlled by control processor 250, outputs to path 48 the signal that it receives from one of optical paths 222 or 227.

Accordingly, then, LOS detector 205 determines whether a viable signal is being received via service path 26 (or protection path 31). If not, LOS detector 205 notifies control processor 250 of that fact, which then causes optical switch 210 to switch the signal that is being received via protection path 31 (more precisely the signal on path 227) to path 48. The system then operates switch S1, which may, for example, a conventional optical switch represented in the FIG. as a relay contact, to interrupt the signal that is being supplied to outgoing service path 25. The interruption should then cause the OPSU at the other end of transmission path 25 to detect a loss of signal and similarly switch to protection path 30, as mentioned above.

Figure 3:
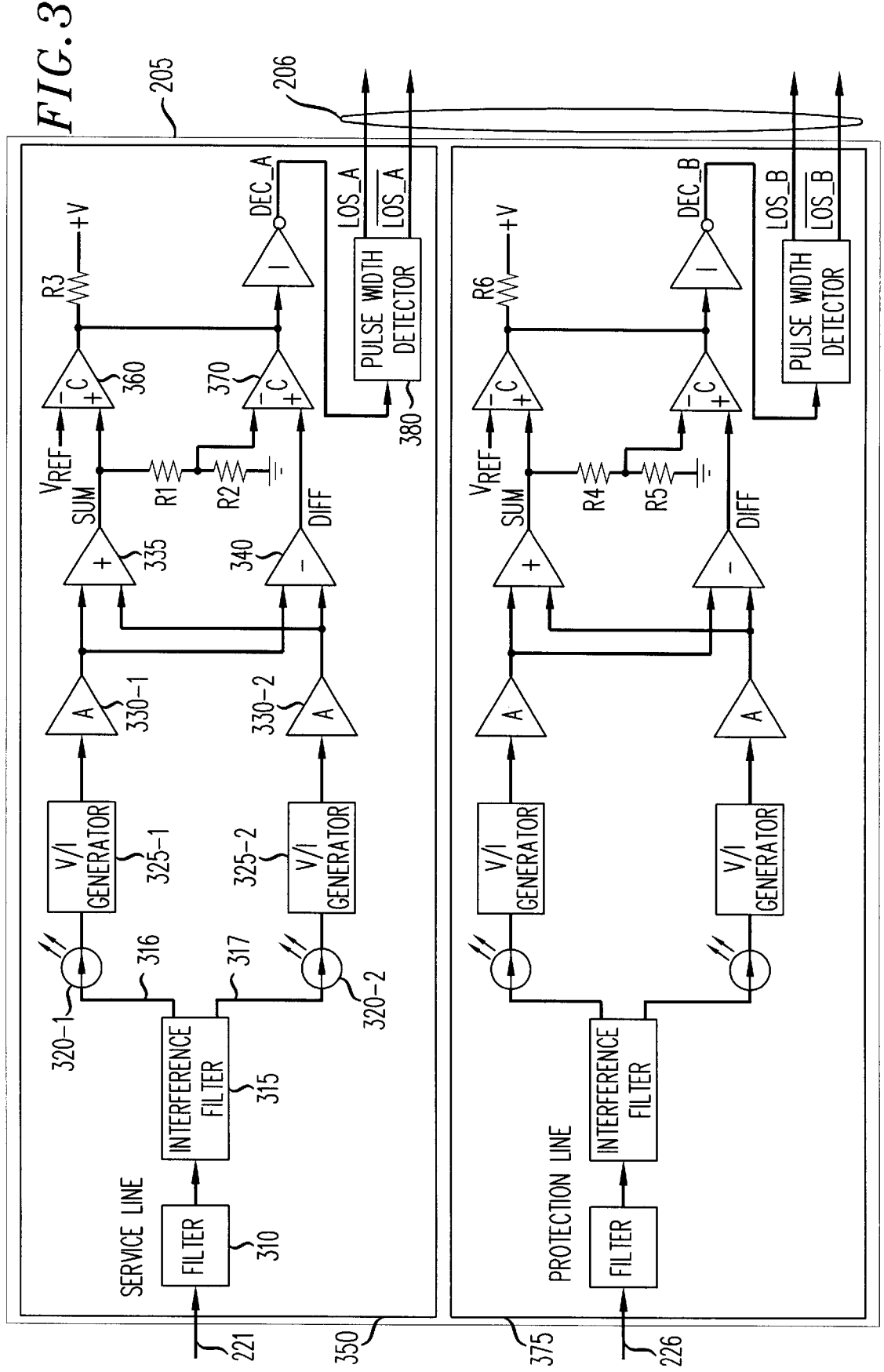
FIG. 3 is a block diagram of the Loss of Signal (LOS) detector of FIG. 2.

A more detailed functional diagram of LOS detector 205 is shown in FIG. 3, and includes processors 350 and 375, which perform similar functions, i.e., the detection of a LOS on paths 26 and 31 (FIG. 1), respectively. A discussion of the way in which one processor operates, e.g., processor 350, thus equally pertains to the other processor, e.g., processor 375, and vice-versa. Turning then to FIG. 3, processor 350, includes filter 310, which may be, for example, a conventional wavelength division multiplexer, to remove a so-called telemetry signal from the signal received via path 221. (Node 150 uses the telemetry signal to send maintenance signals/commands to node 125.) The remaining signal containing the information channels (if present) is supplied to interference filter 315, which may be, for example, a Mach-Zehnder interferometer, illustratively the model FDM-0.8–1.5-M Mach-Zehnder Frequency Division Multiplexer (FDM) available from Photonic Integration Research Inc. (PIRI) of Columbus, Ohio, in which the Mach-Zehnder interferometer is selected, in accordance with an aspect of the invention, such that the free spectral range of the interferometer is close to the channel spacing of the optical signals $\lambda_I$ transported over the optical line system.

Specifically, interference filter 315 is a device having an input port connected to a first directional 50—50 coupler which splits equally a signal received at an input, e.g., a signal received via path 221, into two equal portions and directs the portions to respective waveguides (legs) of unequal length (not shown). The end point of each waveguide connects to a second direction 50—50 coupler, which is used to combine the signals received via the waveguides. Since the lengths of the waveguides are different, then the signals exiting the waveguides at the second coupler (combiner) interfere with one another both constructively and destructively. The signal derived as a result of such constructive (destructive) interference is outputted to path 316 (317) as the main (complementary) signal representing the signals that are in phase (out-of-phase). The main optical signal is then supplied to photodetector 320-1 which converts the optical energy contained in that signal to an electrical signal (i.e., a current). Photodetector 320-2 performs a similar function with respect to the complementary signal outputted to path 317. The photo-current outputted by photodetector 320-1 is supplied to a conventional V/A converter 325-1 (e.g., 2 V/mA converter) which converts the current to a voltage level that is then amplified by conventional amplifier 330-1. Similarly, the photo-current outputted by photodetector 320-2 is supplied to conventional V/A converter 325-2 (also, e.g., a 2 V/mA converter) which converts that current to a voltage level that is then amplified by conventional amplifier 330-2. (Note that in an illustrative embodiment of the invention, amplifiers 330-1 and 330-2 both have a gain of, for example, adjustable between 1 and 2 to respectively equalize the responses of photodetectors 320-1 and 320-2, and to equalize the insertion loss of the different paths in the Mach-Zehnder Interferometer).

The signals respectively amplified by amplifiers 330-1 and 330-2 are supplied to both summing amplifier 335 and difference amplifier 340 to respectively determine the sum of the total power of the light signals outputted by filter 315 and difference between those two powers—meaning that if the difference is large, then the service signal must be present. The reason for this is that the value of the signals derived from the service signal increase significantly when they interfere with one another. Whereas, if the service signal is not present, then such difference would be small—meaning that noise signals dominate as a result of a loss of signal. More specifically, if such difference is less than a predetermined threshold, then there is loss of the service signal, where the value of the threshold is derived as a fraction of the sum of the signals outputted by summer 335 using resistors R1 and R2. (For example, the ratio of R1 to R2 provides a threshold that has a value that is 10% of the value of the summed signal.)

Continuing, the summed signal is supplied to the positive port of comparator 360, which compares the value of summed signal with the value of the threshold $V_{ref}$ supplied to the negative port of comparator 360. Similarly, the difference signal is supplied to the positive port of comparator 365, which compares the value of the difference signal with the value of the threshold derived across resistor R5. The result of both comparisons are "ored" at the input of inverter 370. The output of inverter 370, DEC_A, is high when the value of SUM is low, e.g., <50 millivolts, thereby indicating a loss of power, or when the value of DIFF $$< \frac{R1}{R1 + R2}$$

SUM, thereby indicating a loss of signal. Else, the value of DEC_A is low. (Herein, the above-mentioned loss of power means, for example, that all power into a photodetector has been lost. Also, a loss of signal means, for example, that a photodetector is receiving a light signal but not a coherent light signal. Note that R3 provides a so-called "pull up" function.)

The signal DEC_A is supplied to pulse width detector 380, which monitors the duration of signal DEC_A whenever the value of that signal has a transition from low to high, e.g., ground to +5 volts. If the duration of a high value of DEC_A persists for a predetermined period time (e.g., an adjustable period of time which we call a "old-over" delay) between, e.g., zero seconds and 3.2 seconds (i.e., whatever time is desired between those limits) determined by detector 380, then detector 380 concludes that a LOS has occurred and outputs that fact as signals LOS_A and $\overline{LOS\_A}$, which are supplied to control processor 250 with signals LOS_B and $\overline{LOS\_B}$ via path 206.

Figure 4:
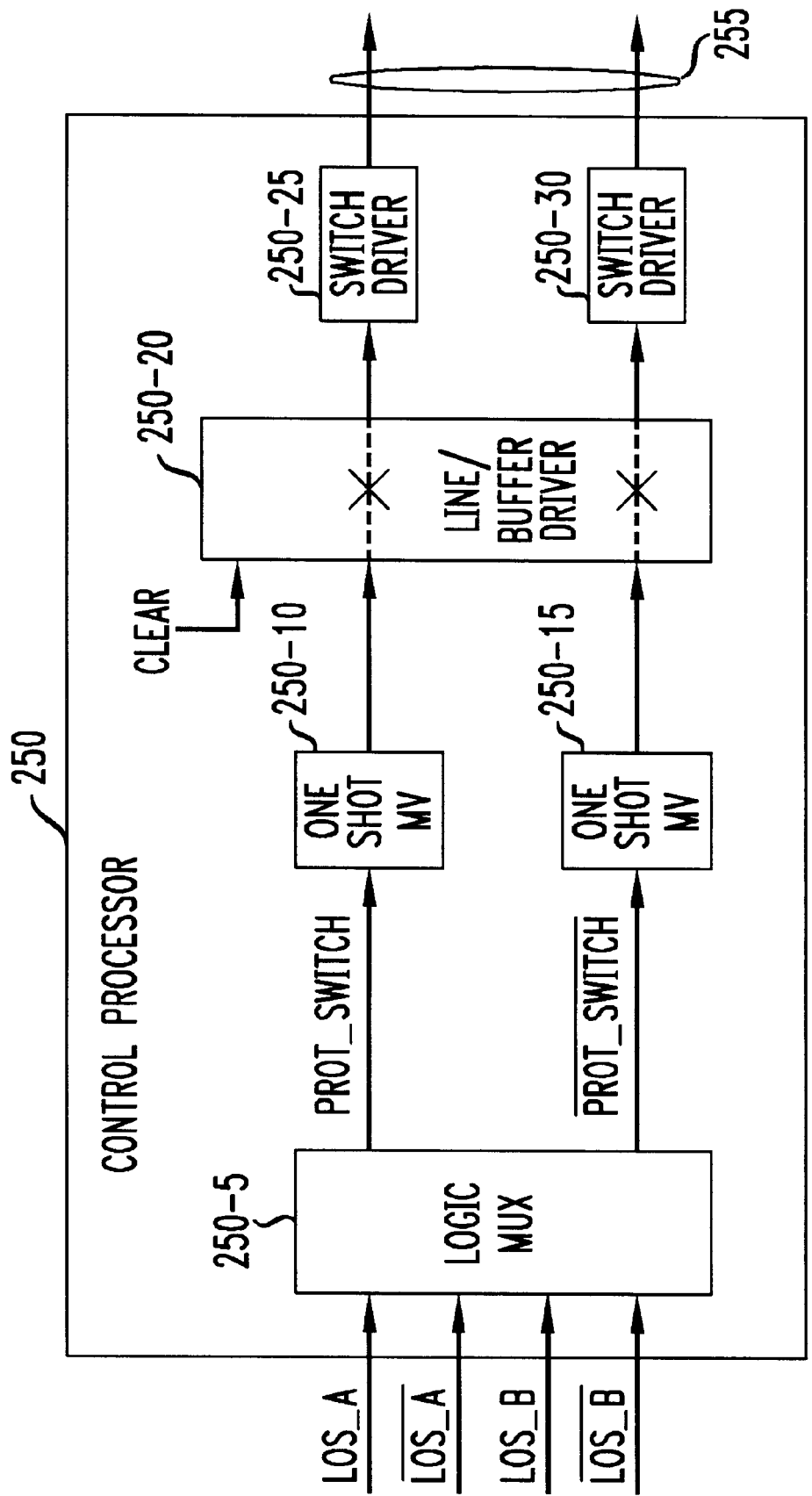
FIG. 4 is a block diagram of the control processor of FIG. 2.

A more detailed functional diagram of control processor 250 is shown in FIG. 4, in which the signals carried via path 206 connect to respective inputs of logic mux 250-5. In an illustrative embodiment of the invention, logic mux 250-5 is combinatorial circuit formed from discrete gates which is implements the following logic. (Note, that it may be appreciated that logic mux 250-5 may be easily implemented using a programmed multiplexer, controller (e.g., a6 8360 processor, etc.)

| If LOS_A and $\overline{LOS\_B}$ then PROT_SWITCH=HIGH | (1) |
| If LOS_B and $\overline{LOS\_A}$ then $\overline{PROT\_SWITCH}$=HIGH | (2) |
| If LOS_A and LOS_B then remain in current state | (3) |
| If $\overline{LOS\_A}$ and $\overline{LOS\_B}$ then remain in current state | (4) | where logic statement 1 indicates that a LOS occurred on incoming in-service (non-protection) path 26 but not on incoming protection path 31. For that case, the system switches to protection path 31. Logic statement 2 indicates that a LOS occurred on protection path 31, but not incoming service path 26. For that case, the system will switch from the protection path to the service path. Logic statement 3 indicates that a LOS has occurred on both paths 26 and 31. For that case, the system does not switch to either path.

Signals PROT_SWITCH and $\overline{PROT\_SWITCH}$ are supplied to respective conventional one-shot multivibrators 250-10 and 250-15 each of which outputs a positive going pulse in response to receiving a positive going pulse at its respective input, in which the duration of such a pulse needs to be greater than the time that it takes optical switch 210 (FIG. 2) to operate to switch from one signal path (e.g., path 26) to the other signal path (31). Such a duration may be, e.g., at least 20 milliseconds. The output of a respective one of the one-shots 250-10 and 250-15 is supplied to a respective buffer/driver of circuit 250-20 which provides a buffer between the one-shots and conventional high-current switch drivers 250-25 and 250-30 (e.g., transistors 250-25 and 250-30 ). That is, buffer/driver 250-20 operates to respectively extend the output of one-shot 250-10 or 250-125 to the switch driver 250-25 or 250-30. A positive pulse at the output of either one-shot 250-10 or 250-15 is thus transferred to a respective buffer/driver of circuit 250-20, which in turn, extends the pulse to a respective one of the conventional optical switch drivers to cause 2×1 optical switch 210 (FIG. 2) to operate. More particularly, a positive pulse at the output of one-shot 250-10 causes driver 250-25 to operate an optical cross-connection in optical switch 210 which disconnects service path 26 from path 48 and connects protection path 31 to path 48. Similarly, a positive pulse at the output of one-shot 250-15 causes driver 250-30 to operate an optical cross-connection in optical switch 210 which disconnects protection path 31 from path 48 and re-connects service path 26 to path 48 (as represented in FIG. 2 by connections 211), in which the foregoing is done all in accordance with the principles of the invention.

Figure 5:
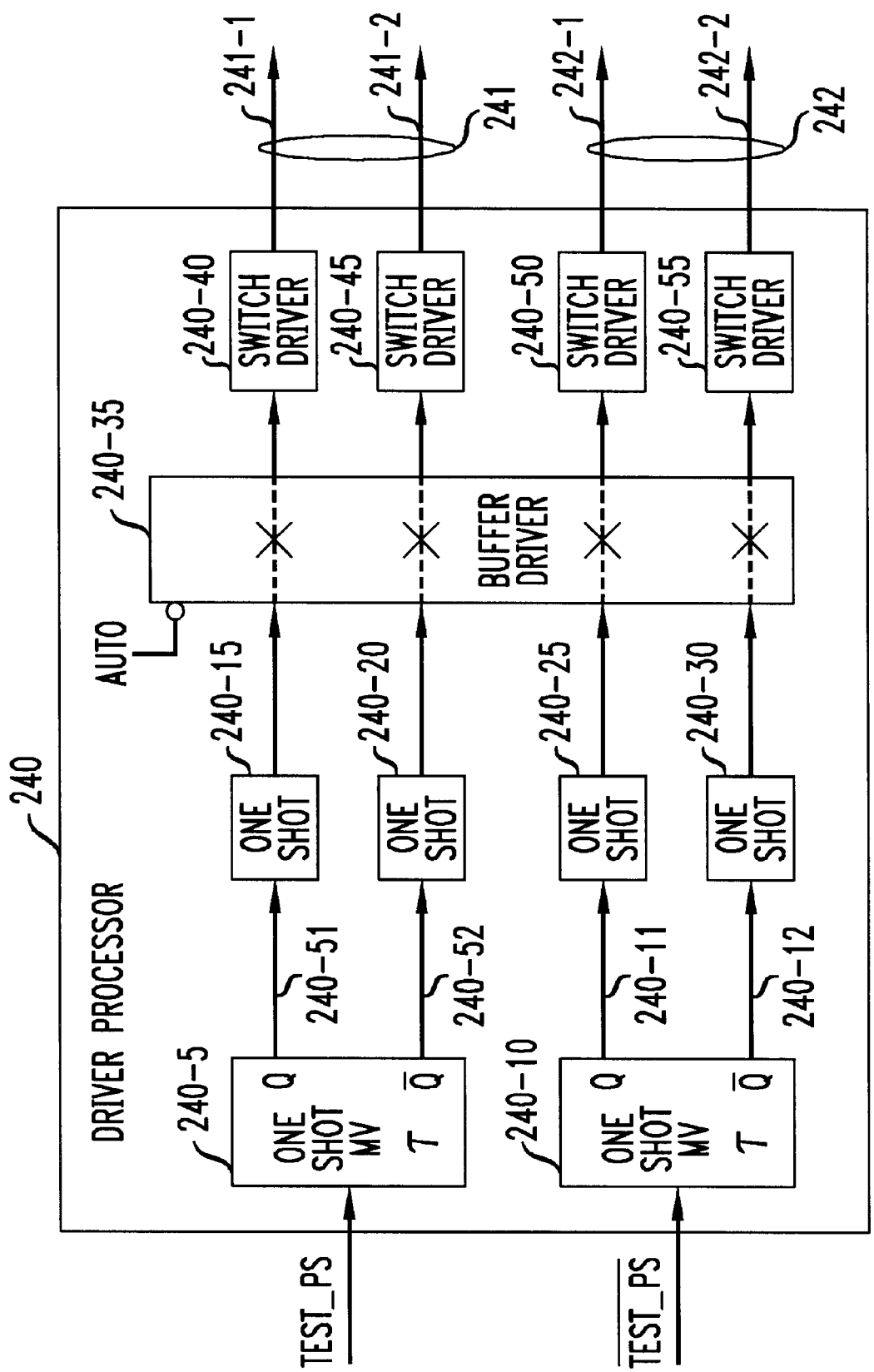
FIG. 5 is a block diagram of the driver processor of FIG. 2.

As is seen from FIG. 2, optical switch 210 includes a conventional relay circuit 212 which, in response to switch driver 250-25 operating optical switch 210, operates in a first way to output a positive signal designated TEST_PS on lead 213 extending to driver processor 240. Note that a conventional RC network 245 is connected to lead 213 (214) to "smooth out" (integrate) contact chatter that occurs when the contacts of relay circuit 212 operate to output signal TEST_PS ($\overline{TEST\_PS}$). A functional block diagram of driver processor 240 is shown in FIG. 5 and includes one-shot multivibrators 240-5 and 240-10, a plurality of other one-shot circuits 240-15, -20, -25 and -30, buffer driver 240-35 and switch drivers 240-40, -45, -50 and -55.

Specifically, responsive to a presence of signal TEST_PS ($\overline{TEST\_PS}$), one-shot MV 240-5 (240-10) switches to an active state for a duration of time τ, e.g., a period of time greater than a so-called hold-over delay that is generated by pulse width detector 375, FIG. 2. In an illustrative embodiment of the invention, the value of τ is set to four seconds to ensure that the value of τ will be greater than the hold-over delay, even if the delay is increased somewhat. When one-shot 240-5 (240-10) switches to an active state, its Q output goes high (e.g., to +5v) and its $\overline{Q}$ goes low (e.g., to ground) for the duration of τ. The high going pulse on lead 240-51 triggers one-shot 240-15 which outputs a positive going pulse having a duration of, for example, twenty milliseconds, to buffer/driver 240-35, which similarly provides a buffer function between one-shot 240-15 and switch 240-40.

As mentioned above, when switch 230 (S1) operates it disrupts the signal carried over path 25, thereby causing the opposite end node, e.g., node 150, to declare a LOS over path 25 and switch to the protection path. At the end of the twenty millisecond period, one-shot 240-15 returns to its original state, thereby causing switch driver 240-40 to release. Optical switch 230, however, remains operated. At the end of duration τ, the Q and $\overline{Q}$ outputs of one-shot MV 240-5 return to their original (or opposite) logic states, which means that the $\overline{Q}$ output extending to one shot 240-20 via lead 240-52 returns to a high level e.g., +5 volts. The positive going transition at $\overline{Q}$ causes one-shot 240-20 to change state and output a positive pulse having a duration of, for example, twenty milliseconds. That output pulse is similarly buffered by buffer/driver 240-35 and then extended to switch driver 240-45 causing driver 240-45 to operate and reset switch 230 and return switch 230 to its original state. At the end of twenty milliseconds, one-shot 240-20 returns to its original state, thereby releasing switch driver 240-45. Note that one-shot MV 240-10, one-shot circuits 240-25 and 240-35, buffer/driver 240-35 and switch drivers 240-50 and 240-55 cooperate in a similarly manner when (a) a LOS has been detected on the protection path, (b) that path is in service (i.e., has been connected to path 48) and (c) the service path (25 and 26) is available for service, as determined by the foregoing. In that case, switch driver 240-50 operates for twenty milliseconds and, in turn, operates optical switch 235 (S2) to disrupt the signal carried over protection path 30 and, thus cause the opposite end, e.g., node 150, to switch to the original service line. Also, when one-shot MV 240-10 returns to its original state, switch driver 240-55 will similarly operate for twenty milliseconds and reset optical switch 235.

The foregoing is merely illustrative of the principles of the invention. Those skilled in the art will be able to devise numerous arrangements, which, although not explicitly shown or described herein, nevertheless embody those principles that are within the spirit and scope of the invention. For example, the foregoing discussed the invention in the context of a service line and protection line for the purposes of clarity and conciseness. In fact, there is no such distinction between the bidirectional paths. To say it another way, the path that is in service may be called herein the active path and the out-of-service path may be called herein the standby path (protection path). As another example, interference filter 315 may be, for example, Fabry-Perot etalon, fiber grating, etc. As a further example, the foregoing was discussed in the context of what is commonly referred to as a 1+1 protection switching system. It is clear that the LOS detector may be readily used in other types of protection switching systems, for example, a 1×N protection switching system, in which one protection line/path protects anyone of N active lines, where N>1.

We claim:

1. An optical communications node having first and second bi-directional communications paths respectively serving as a service path and protection path, said node further comprising
    an optical protection switching unit operative for filtering signals respectively received over the service and protection paths to generate a main signal and a complementary signal for each of the paths and supplying the generated signals to control apparatus,
    said control apparatus generating a Loss of Signal (LOS_A) indication for the service path if a SUM signal or DIFF signal respectively derived as a function of a sum of the main and complementary signals generated for the service path and difference between the main and complimentary signals generated for the service path is less than a respective threshold value, and invoking protection switching responsive to the presence of the LOS_A indication.

2. The optical protection switching unit of claim 1 further comprising a number of interference filters that receives a respective one of the signals transported over the service and protection paths and generates signals which constructively interfere with each other to form the main signal and signals which destructively interfere with each other to form the complementary signal; and apparatus that converts the main signal and complementary signal outputted by each of the interference filters to electrical signals.

3. The optical protection switching unit of claim 2 wherein the interference filter is a Mach-Zehnder Interferometer.

4. The optical protection switching unit of claim 2 wherein the received signals have different wavelengths and wherein the Mach-Zehnder Interferometer is selected such that it has a free spectral range respectively matching such wavelengths.

5. The optical protection switching unit of claim 1 wherein the filter is a Mach-Zehnder Interferometer.

6. The optical protection switching unit of claim 5 wherein the received signals have different wavelengths and wherein the Mach-Zehnder Interferometer is selected such that it has a free spectral range respectively matching such wavelengths.

7. The optical switching unit of claim 1 wherein the threshold value for the DIFF signal is derived from the value of the SUM signal.

8. The optical switching unit of claim 1 wherein the control unit further comprises apparatus that generates a Loss of Signal (LOS_B) indication for the protection path if a SUM signal or DIFF signal respectively derived as a function of a sum of the main and complementary signals generated for the protection path and difference between the main and complimentary signals generated for the protection path is less than a respective threshold value, and, responsive to the LOS_B indication, restoring the service path to service if it is available for service and it had been idle as a result of a previous switch to the protection switching.

9. The optical switching unit of claim 8 further comprising a logical multiplexer that (a) if the LOS_A state and a $\overline{\text{LOS\_B}}$ state are present, outputs an indication to switch to the protection path (b) if the LOS_B state and a $\overline{\text{LOS\_A}}$ state are present, outputs an indication to switch to the service path if it is available, or (c) if either (a) the LOS_A state and LOS_B state are present; or (b) the $\overline{\text{LOS\_A}}$ state and $\overline{\text{LOS\_B}}$ state are present, outputs an indication not switch to either path.

10. The optical switching unit of claim 8 further comprising apparatus, responsive to switching to the service path from the protection path, for causing a node connected at the opposite ends of the first and second bi-directional communications path to switch to the service path.

11. The optical switching unit of claim 1 further comprising apparatus, responsive to the invoking of protection switching for causing a node connected at the opposite ends of the first and second bi-directional communications path to switch to the protection path.

12. The optical switching unit of claim 1 wherein the optical communications node is 1+1 optical line system.

13. The optical switching unit of claim 1 wherein the optical communications node is 1×N optical line system.

14. Apparatus for detecting a loss of signal on an in-service optical communications path comprising,
    a filter that generates from an optical signal received via the in-service optical communications path a plurality of optical signals, in which ones of the generated optical signals constructively interfere with one another and in which other ones of the generated optical signals destructively interfere with one another, and that outputs the signals that constructively interfere as a main signal and outputs the signals that destructively interfere as a complementary signal,
    a plurality of optical signal converters that respectively receive the main and complementary signals and convert those signals to electrical signals,
    apparatus that generates a SUM signal indicative of the sum of the values of the converted main and complementary signals and a DIFF signal indicative of the difference in values of the converted main and complementary signals, and apparatus that generates a Loss of Signal (LOS_A) indication for the service path if the SUM signal or DIFF signal is less than a respective threshold value.

15. The apparatus of claim 14 future comprising control circuitry that, responsive to a presence of the LOS_A indication, switches communications from the optical communications in-service path to a optical communications protection path.

16. The apparatus set forth in claim 15 further comprising another filter that generates from an optical signal received via the optical communications protection path another plurality of optical signals, in which ones of the generated other optical signals constructively interfere with one another and in which other ones of the other generated optical signals destructively interfere with one another, and that outputs the signals that constructively interfere as another main signal and outputs the signals that destructively interfere as another complementary signal, another plurality of optical signal converters that respectively receive the other main and complementary signals and convert those signals to electrical signals, apparatus that generates a SUM signal indicative of the sum of the values of the other converted main and complementary signals and a DIFF signal indicative of the difference in values of the other converted main and complementary signals, and apparatus that generates a Loss of Signal (LOS_B) indication for the protection path if the other SUM signal or other DIFF signal is less than a respective threshold value.

17. The apparatus of claim 16 further comprising restoration apparatus, responsive to the LOS_B indication, for restoring the optical communications service path to service if it is available for service and it had been idle as a result of a previous switch to the optical communications protection path.

18. The apparatus of claim 16 further comprising a logical multiplexer that (a) if the LOS_A indication and a $\overline{\text{LOS\_B}}$ indication are present, switches to the protection path (b) if the LOS_B indication and a $\overline{\text{LOS\_A}}$ indication are present, switches to the service path if it is available, or (c) If the LOS_A indication and LOS_B indication are present, does not switch to either path.

19. The apparatus of claim 15 further comprising switching apparatus, responsive to the invoking of protection switching for causing a node connected at the opposite end of the in-service optical communications path to switch to the protection path.

20. The optical switching unit of claim 16 further comprising switching apparatus, responsive to switching to the service path from the protection path, for causing a node connected at the opposite ends of the first and second bidirectional communications path to switch to the service path.

21. The apparatus of claim 14 wherein the interference filter is a Mach-Zehnder Interferometer.

22. The apparatus of claim 21 wherein the received optical signal is formed from a plurality of optical signals have different wavelengths and wherein the Mach-Zehnder Interferometer is selected such that it has a free spectral range respectively matching such wavelengths.

23. The apparatus of claim 14 wherein the threshold value for the DIFF signal is derived from the value of the SUM signal.

* * * * *